(12) United States Patent
Yamazaki et al.

(10) Patent No.: US 9,126,587 B2
(45) Date of Patent: Sep. 8, 2015

(54) HYBRID VEHICLE DRIVE CONTROL SYSTEM AND METHOD FOR PROVIDING MOTOR TORQUE BOOST COMPENSATING FOR ENGINE DELAY AND TORQUE EXCEEDING MAXIMUM ENGINE TORQUE

(75) Inventors: Mark Steven Yamazaki, Canton, MI (US); Fazal Urrahman Syed, Canton, MI (US); Francis Thomas Connolly, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 419 days.

(21) Appl. No.: 13/326,428

(22) Filed: Dec. 15, 2011

(65) Prior Publication Data

US 2013/0158756 A1  Jun. 20, 2013

(51) Int. Cl.
*B60W 20/00* (2006.01)
(52) U.S. Cl.
CPC ......... *B60W 20/1088* (2013.01); *B60W 20/106* (2013.01); *B60W 20/108* (2013.01); *B60W 2710/0666* (2013.01); *B60W 2710/083* (2013.01)
(58) Field of Classification Search
CPC .................. B60W 20/1088; B60W 2710/083; B60W 2710/0666; B60W 20/10; B60W 20/106; B60W 20/108; B60W 20/40

USPC ............................................. 701/22; 903/930
See application file for complete search history.

(56) References Cited

U.S. PATENT DOCUMENTS

| | | | |
|---|---|---|---|
| 6,647,326 B2* | 11/2003 | Nakamori et al. | 701/22 |
| 6,862,511 B1 | 3/2005 | Phillips et al. | |
| 7,792,628 B2 | 9/2010 | Aswani et al. | |
| 7,967,720 B2 | 6/2011 | Martin et al. | |
| 2008/0293538 A1* | 11/2008 | Saito et al. | 477/3 |
| 2010/0062896 A1 | 3/2010 | Falkenstein | |
| 2010/0323844 A1* | 12/2010 | Okubo et al. | 477/3 |

* cited by examiner

*Primary Examiner* — Helal A Algahaim
*Assistant Examiner* — Genna Mott
(74) *Attorney, Agent, or Firm* — David B. Kelley; Brooks Kushman P.C.

(57) ABSTRACT

A vehicle control system including a combustion engine and an electric motor selectively provided torque to a transmission separately or in combination to meet driver torque demand. The engine has a maximum torque output value and a torque increase delay response function spanning a predetermined time period. A motor torque boost signal requests an increase in torque provided from an electric motor if the engine torque request signal exceeds the maximum torque output of the engine or the torque increase delay response function of the engine. The motor torque boost signal is time limited and a second level of motor torque boost may be provided for a second limited time period.

18 Claims, 3 Drawing Sheets

HYBRID VEHICLE DRIVE CONTROL SYSTEM AND METHOD FOR PROVIDING MOTOR TORQUE BOOST COMPENSATING FOR ENGINE DELAY AND TORQUE EXCEEDING MAXIMUM ENGINE TORQUE

TECHNICAL FIELD

This disclosure relates to a vehicle control system that includes a combustion engine and an electric motor that selectively provide torque to a transmission separately or in combination in a parallel arrangement to meet driver propulsion torque demand within limits that protect the motor, transmission and battery.

BACKGROUND

Hybrid vehicles have a combustion engine and a battery powered electric motor that are selectively engaged to drive the vehicle. The combustion engine has maximum rated torque output and a delayed response to a demand for increased torque. Fuel consumption can be reduced by providing the vehicle with a smaller engine, however, the maximum rated torque of the smaller engine results in slower acceleration for the vehicle if the smaller engine is used alone.

Improved responsiveness in hybrid vehicles that have smaller engines can be provided by adding a torque boost from the electric motor while the engine is driving the vehicle. Adding torque from the electric motor discharges the battery and reduces the range of vehicle operation in the battery powered driven mode.

The transmission for the hybrid vehicle may include a hydraulic control system that utilizes a separate pump motor that adds weight to the vehicle and discharges the battery. The electric motor may be used to provide line pressure to the transmission but a minimum level of line pressure must be maintained to protect the transmission.

The above problems and others are addressed by this disclosure as summarized below.

SUMMARY

According to one aspect of this disclosure, a vehicle drive control system is provided for an engine control unit for an engine and a torque motor control unit for an electric motor. The engine has a maximum torque output value and a torque increase delay response function that spans a predetermined time period. A transmission selectively receives torque from one or both of the engine and the motor. The vehicle drive control system is configured to receive a torque request signal requesting an increase in torque from an acceleration control member, such as an accelerator pedal. A motor torque boost signal requesting an increase in torque from the electric motor is generated if the torque request signal exceeds at least one of the maximum torque output of the engine or the torque increase delay response function of the engine. The motor torque boost signal is initially limited to a maximum motor torque value required to meet the torque level of the torque request signal for a first period of time that is based upon the predetermined time period.

According to an alternative disclosed embodiment, the vehicle drive system may further reduce the motor torque boost signal after the first time period to substantially the same level of torque as the maximum torque output value for a second period of time. The motor torque boost signal during the second period of time may be shaped by a filter that smooths changes in the motor torque signal to improve drivability by eliminating rapid changes in torque reduction. The vehicle drive system may even further reduce the motor torque boost signal or terminate the motor torque boost signal after the second period of time.

According to other aspects of the disclosure, the predetermined time period may be the time delay required to increase engine torque output from a current torque level to the maximum torque output due to delay in engine response. The torque request signal may further include a battery charge torque request that is summed with the torque request signal to generate an engine torque command that is between an engine torque minimum value and an engine torque maximum value. This battery torque request may appear outside of periods of transient motor torque request.

The electric motor may have a minimum torque level output and a maximum torque level output and the motor torque boost signal may be limited to between the minimum torque level output and the maximum torque level output. The vehicle drive control system may also include a fluid power system for the transmission that receives torque from the electric motor and that requires a minimum line pressure. The minimum torque level output from the electric motor may correspond to the torque required to maintain the minimum line pressure.

According additional aspects of the disclosure, the motor torque boost signal may be limited to between a battery discharge maximum limit and a battery charge minimum limit. The battery discharge maximum limit and the battery charge minimum limit may be calibrated to include a system power loss value.

According to another aspect of the disclosure, a method of controlling a vehicle drive system is provided that includes an engine control unit for an engine having a maximum torque output value and a torque increase delay response function that spans a predetermined time period, a torque motor control unit for an electric motor, and a transmission that selectively receives torque from one or both of the engine and the motor. The method comprises initiating a torque request signal requesting a torque boost with an accelerator control member. A motor torque boost signal requesting an increase in torque from the electric motor is generated if the torque request signal exceeds at least one of the maximum torque output or the torque increase delay response function. The motor torque boost signal is limited initially to a maximum motor torque value available to meet the torque level of the torque request signal for a first period of time that is based upon the predetermined time period.

According to other aspects of the disclosure, the method may further comprise reducing the motor torque boost signal after the first time period to substantially the same level of torque as the maximum torque output value for a second period of time. The motor torque boost signal is further reduced after the second period of time. Alternatively, the method may further comprise terminating the motor torque boost signal after the second period of time. The predetermined time period may be the delay time required to increase engine torque output from a current torque level to the maximum torque output due to delayed engine response.

The torque request signal further may include a battery charge torque request that is summed with the torque request signal to generate an engine torque command that is between an engine torque minimum value and an engine torque maximum value. The electric motor may have a minimum torque level output and a maximum torque level output and the motor torque boost signal is between the minimum torque level output and the maximum torque level output.

The method may also include providing a transmission that has a fluid power system that receives torque from the electric motor and that requires a minimum line pressure. The minimum torque level output from the electric motor corresponds to the torque required to maintain the minimum line pressure.

The method may also include the step of checking the motor torque boost signal as to whether the signal is between a battery discharge maximum limit and a battery charge minimum limit. The battery discharge maximum limit and the battery charge minimum limit may be calibrated to include a system power loss value.

The above aspects of the disclosure and other aspects will be better understood in view of the attached drawings and the following detailed description of the illustrated embodiments.

DETAILED DESCRIPTION

A detailed description of the illustrated embodiments of the present invention is provided below. The disclosed embodiments are examples of the invention that may be embodied in various and alternative forms. The figures are not necessarily to scale. Some features may be exaggerated or minimized to show details of particular components. The specific structural and functional details disclosed in this application are not to be interpreted as limiting, but merely as a representative basis for teaching one skilled in the art how to practice the invention.

Figure 1:
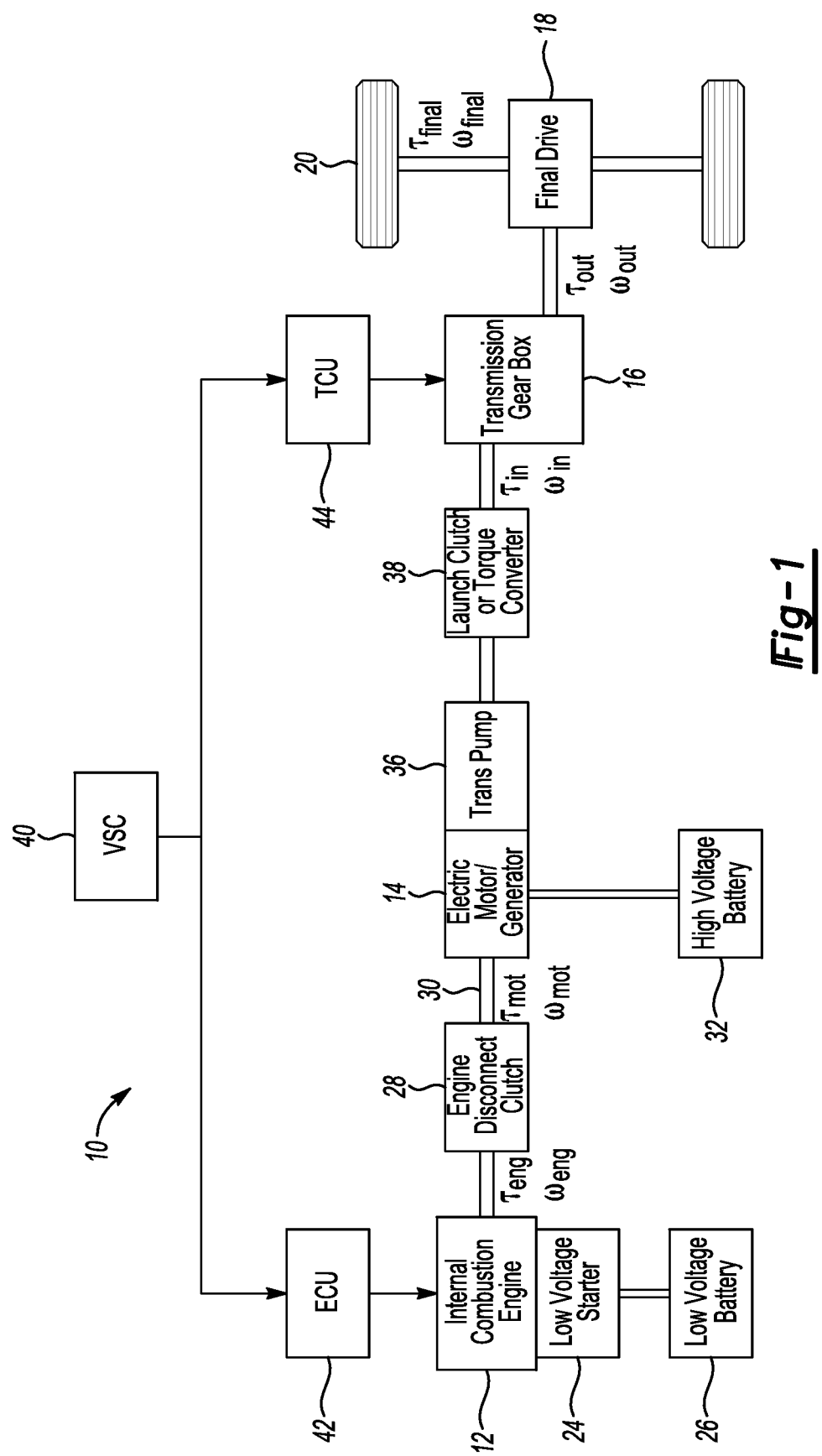
FIG. 1 is a schematic diagram of a hybrid electric vehicle drive train.

Referring to FIG. 1, a hybrid vehicle drive train is generally indicated by reference numeral 10. The hybrid vehicle 10 includes an internal combustion engine 12 and an electric motor/generator 14 that provide power in parallel for the vehicle through a transmission gear box 16 and a differential 18. Torque is provided from either or both of the internal combustion engine 12 and the motor/generator 14 through the transmission 16 and differential 18 to the drive wheels 20.

The internal combustion engine 12 is started with a low voltage starter 24 that is powered by a low voltage battery 26. An engine disconnect clutch 28 is provided in the engine driveline 30. The engine disconnect clutch allows the engine to either charge the high voltage battery 32 through the motor/generator 14 and also is connected to provide input torque to the transmission gear box 16. The electric motor/generator 14 may be disconnected from internal combustion engine 12 when the vehicle 10 is operated in the electric motor drive mode with power being provided from the high voltage battery 32 and input torque being provided to the transmission 16 by the motor/generator 14.

A transmission pump 36 is included as part of the electric motor/generator that provides hydraulic fluid under pressure to the transmission gear box and launch clutch 38, or a torque converter. The torque converter 38 may be used instead of a launch clutch. The transmission pump 36 is operated by the electric motor/generator to provide minimum line pressure to the hydraulic circuit of the transmission 16.

The vehicle 10 includes a control system including a vehicle system controller (VSC) 40, an engine control unit (ECU) 42, and a transmission control unit (TCU) 44. The VSC 40 receives commands from the driver via an accelerator pedal or cruise control system. The VSC 40 also monitors battery charge conditions and engine and motor/generator operation. The VSC 40 also provides torque motor commands through the TCU 44 to either the motor/generator 14 or the transmission 16. Although the illustrated embodiment of the control system includes three separate controllers in FIG. 1, other embodiments of the control system could utilize more or fewer controllers.

Figure 2:
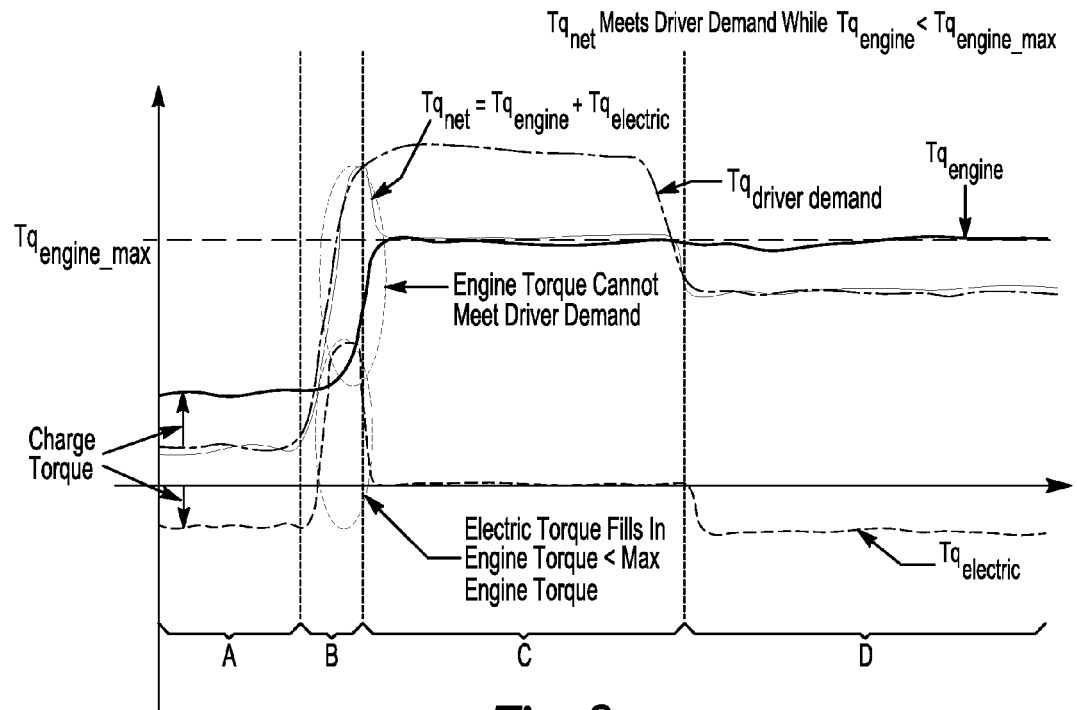
FIG. 2 is a torque diagram for a hybrid electric vehicle operating initially under propulsion power provided by the engine and receiving a torque boost from the motor when the engine torque is less than the maximum engine torque.

Referring to FIG. 2, a torque diagram is provided that illustrates initial operation, at time period A, with a low level of engine torque (line $Tq_{engine}$) being provided to operate the vehicle and charge the battery (line $Tq_{electric}$). A rapid increase in driver demand (line $Tq_{driver\ demand}$), at time period B, is met by initially providing torque from the motor/generator 14 (hereinafter "M/G torque") (line $Tq_{electric}$) to fill in torque where the engine torque cannot meet the driver demand. Net torque (line $Tq_{net}$) is provided as the sum of the engine torque and the M/G torque boost following the rapid increase in driver demand torque. The M/G torque boost lasts for a short duration of time generally corresponding to the length of time required for the engine to reach its maximum torque level. The limitation of the M/G torque boost to a short length of time limits the amount of power discharged from the battery to provide the M/G torque boost. Even though the driver demand continues at an elevated level for a longer period, at time period C, no torque boost is provided, but the engine does not provide charging torque to make available the full amount of torque in response to the driver's continued demand. After the driver demand drops below the maximum engine torque level, at time period D, torque may be provided from the engine to the battery for charging purposes.

Figure 3:
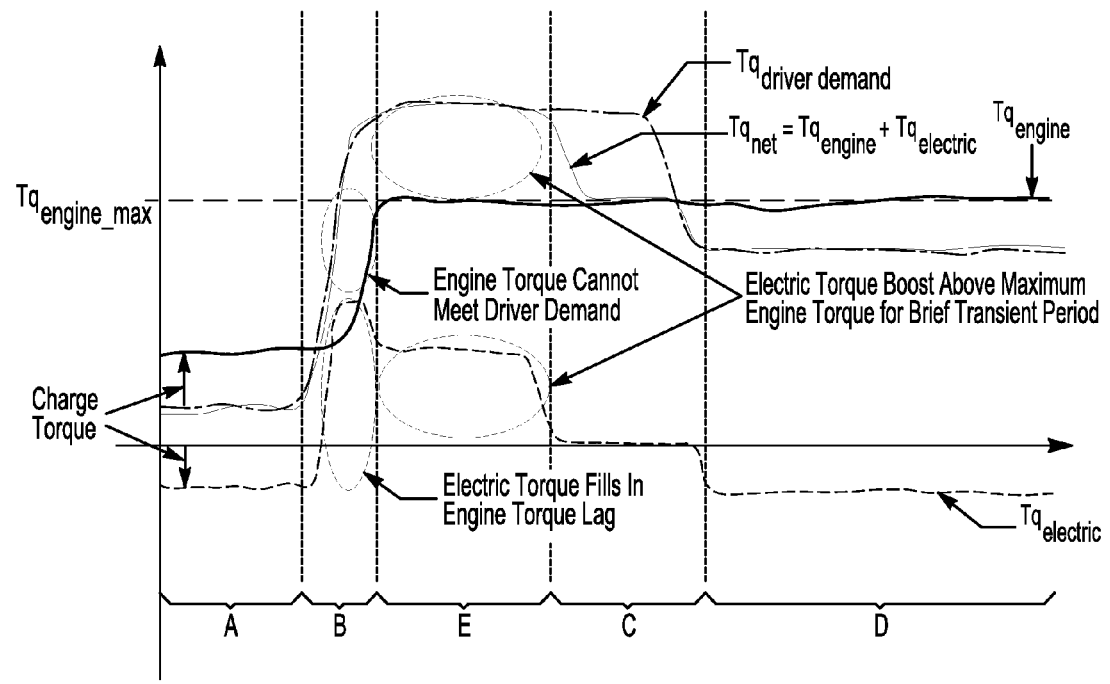
FIG. 3 is a torque diagram for a hybrid electric vehicle operating initially under propulsion power provided by the engine and receiving a torque boost from the motor when the engine torque is less than the maximum engine torque and continuing the torque boost for a brief period thereafter.

Referring to FIG. 3, a torque diagram is provided that illustrates M/G torque boost being provided while the engine torque is less than the maximum engine torque and for a brief period thereafter. The torque diagram begins with the engine providing torque to drive the vehicle and also charge the battery, at time period A. A rapid increase in driver demand, at time period B, is then shown that is met by a summing of the engine torque provided and an M/G torque boost that enables the vehicle to meet the driver demand initially without lag or delay in acceleration. After the initial M/G torque boost, the torque boost may continue above maximum for a brief transient time period, at time period E. The motor torque boost signal during the second period of time may be shaped by a filter that smooths changes in the motor torque signal to minimize rapid changes in torque reduction. After the transient time period, at time period C, the VSC ends the M/G torque boost, but does not provide engine torque for charging the battery until the driver demand for torque falls below the maximum engine torque level. When the driver demand falls below the maximum engine torque level, at time period D, torque is provided through the electric motor/generator to charge the battery.

Figure 4:
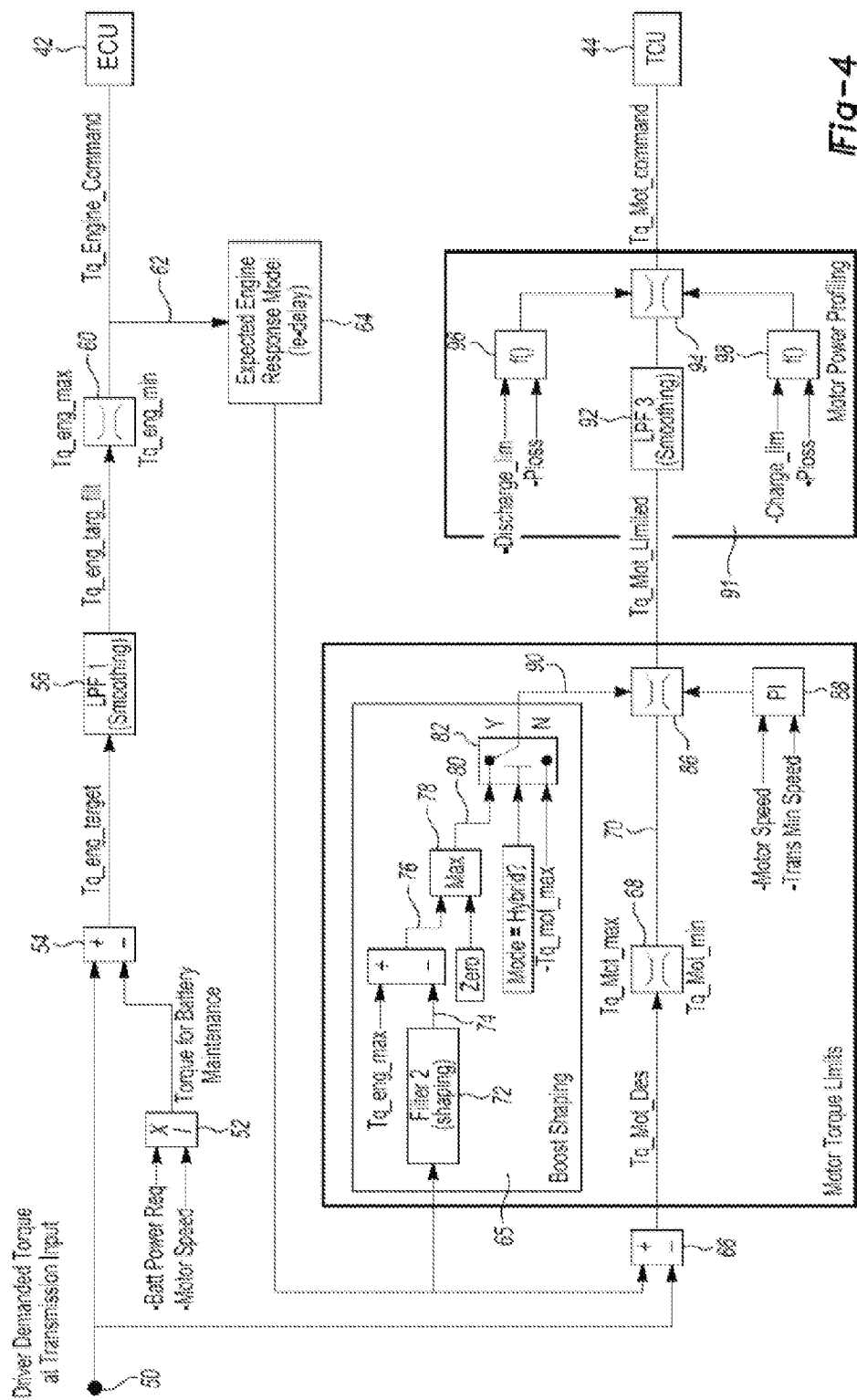
FIG. 4 is a control diagram for a hybrid electric vehicle system control for providing electric motor torque boost to meet driver demand exceeding the maximum engine torque and to increase torque compensating for engine torque response delay.

Referring to FIG. 4, a simplified control diagram is provided that is used to control the M/G torque boost described above with reference to FIGS. 2 and 3. A target torque (Tq_eng_targ) is determined at 54 by comparing the difference between a driver demand 50 and a battery power requirement divided by Motor Speed, at 52, that allows for torque for battery maintenance. The target torque is provided to a low pass filter 56 that smoothes the signal to prevent step changes and remove high frequency ripples. The low pass filter 56 provides a filtered engine torque target signal (Tq_eng_targ_filt). The filtered engine torque target signal is limited by an engine torque min/max limiter, at 60, to provide an engine torque command signal (Tq_Engine_Command) to the ECU 42.

The engine torque command signal (Tq_Engine_Command) is also provided on line 62 to an expected engine response delay model, at 64, that delays and shapes the engine torque command signal to reflect the expected actual torque of the engine. The output of the model 64 is used within the boost shaping block 65 to compensate for the torque lag of the engine, as described below.

The output of the delay model 64 is subtracted from the driver torque request 50, at 66, to provide a motor torque demand signal (Tq_Mot_Des). This signal allows the motor to fill in added torque until the expected engine torque rises, as shown in FIGS. 2 and 3 in period B. The motor torque demand signal is limited by a motor torque min/max limiter, at 68, and provides an output on line 70.

A shaping filter 72 in the boost shaping block 65 controls the torque boost that continues above maximum for a brief transient time period, at time period E illustrated in FIG. 3, after the initial M/G torque boost. Shaping filter 72 may be a low pass filter, ramp filter, sample and hold filter, or other custom filter depending upon the desired duration of the transient time period of boost torque and profile of the boost decay, or rate of reduction.

The upper limit for the motor torque is calculated by subtracting the filtered engine torque request on line 74 from the shaping filter 72 from the maximum available engine torque (Tq_eng_max). The upper limit signal at line 76 remains high until the output of shaping filter 72 rises to meet (Tq_eng_max). The torque limit is compared with zero at Max block 78 and the larger value is passed through on line 80. When the motor upper limit is forced to zero the motor boost is terminated even if the driver demanded torque remains above the maximum allowable engine torque.

A switch block 82 determines whether the mode of operation is in the hybrid mode with the engine 12 or that the mode is not in the hybrid mode with only the electric drive on. If the system is in the hybrid mode with the engine on the upper limit is the output from the Max block 78 on line 80. If the system is not in the hybrid mode with only the electric drive on, the engine limits are irrelevant.

A lower clip is provided for motor torque for maintaining a minimum speed for transmission pump pressure at motor torque min/max limit block 86. A minimum motor speed is required for the transmission pump 36 (shown in FIG. 1). If the motor speed falls below the minimum speed for protection of the transmission pump, a PI (product-integral) controller 88 may be used to keep the speed from dropping below the minimum speed. Motor torque min/max limiter 86 has an upper clip provided on line 90 that is the output of boost shaping block 65.

A limited motor torque filtered signal (Tq_mot_Limited) is provided by the motor torque min/max limit block 86 to a Motor power profiling block 91 that limits the motor torque from exceeding the operational boundaries of the high voltage battery 32 (shown in FIG. 1). The limited motor torque filtered signal (Tq_mot_Limited) is provided to low pass filter 92 that smoothes the motor torque to prevent step changes in operation, and reduce ripples in the motor torque command signal (Tq_Mot_command).

A battery power min/max limit block 94 clips the motor torque to a maximum that is a function of the battery discharge limit and electrical system loss, at 96, and a minimum that is a function of the battery charge limit and electrical system loss, at 98. The battery power min/max limit block 94 provides a torque motor command signal (Tq_Mot_Command) to the transmission control unit 44 and to either the motor/generator 14 or transmission 16 (shown in FIG. 1).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
   a vehicle system controller in communication with a transmission control unit that controls an electric motor and an engine control unit that controls an engine, the engine control unit having a maximum torque output value and a torque increase delay response function that spans a predetermined time period;
   a transmission that selectively receives torque from one or both of the engine and the motor;
   the vehicle system controller configured to:
   receive a torque request signal requesting an increase in torque from an acceleration control member, the torque request signal exceeding the torque increase delay response function of the engine control unit during a first period of time and exceeding the maximum torque output value of the engine control unit during a second period of time and a third period of time;
   generate a motor torque boost signal requesting an increase in torque from the electric motor;
   adjust the motor torque boost signal to a motor torque value required to compensate for the torque increase delay response function to meet the torque request signal during the first period of time;
   reduce the motor torque boost signal during the second period of time, after the first period of time once the engine has reached the maximum torque output value, such that a combined engine and electric motor torque meets the torque request signal, wherein the engine maintains the maximum torque output value and the motor maintains a first substantially constant torque value during the second period of time; and
   further reduce the motor torque boost signal during the third period of time, after the second period of time to preserve battery charge, such that the combined engine and electric motor torque is less than the torque request signal, wherein the engine maintains the maximum torque output value and the motor maintains a second substantially constant torque value during the third period of time.

2. The vehicle of claim 1 wherein the predetermined time period is a time delay required to increase engine torque output from a current torque level to the maximum torque output due to delay in engine response.

3. The vehicle of claim 2 wherein the first period of time corresponds to the predetermined time period followed by a duration in which the torque request signal is greater than a maximum torque output of the engine.

4. The vehicle of claim 1 wherein the torque request signal further includes a battery charge power request that is summed with the torque request signal to generate an engine torque command that is between an engine torque minimum value and an engine torque maximum value.

5. The vehicle of claim 1 wherein the electric motor has a minimum torque level output and a maximum torque level output and the motor torque boost signal is between the minimum torque level output and the maximum torque level output.

6. The vehicle of claim 1 wherein the motor torque boost signal is between a battery discharge maximum limit and a battery charge minimum limit.

7. The vehicle of claim 6 wherein the battery discharge maximum limit and the battery charge minimum limit are calibrated to include a system power loss value.

8. A vehicle comprising:
a vehicle system controller in communication with a transmission control unit that controls an electric motor and an engine control unit that controls an engine, the engine control unit having a maximum torque output value and a torque increase delay response function that spans a predetermined time period;
the vehicle system controller configured to:
receive a torque boost request from an accelerator control member, the torque boost request exceeding the torque increase delay response function of the engine control unit during a first period of time and exceeding the maximum torque output value of the engine control unit during a second period of time and a third period of time;
communicate with the transmission control unit to increase the torque from the electric motor;
adjust the motor torque to a motor torque value required to compensate for the torque increase delay response function to meet the torque boost request during the first period of time;
reduce the motor torque during the second period of time, after the first period of time once the engine has reached the maximum torque output value, such that a combined engine and electric motor torque meets the torque boost request, wherein the engine maintains the maximum torque output value and the motor maintains a first substantially constant torque value during the second period of time; and
further reduce the motor torque during the third period of time, after the second period of time to preserve battery charge, such that the combined engine and electric motor torque is less than the torque boost request, wherein the engine maintains the maximum torque output value and the motor maintains a second substantially constant torque value during the third period of time.

9. The vehicle of claim 8 wherein the first period of time corresponds to the predetermined time period followed by a duration in which the torque boost request is greater than a maximum torque output of the engine.

10. The vehicle of claim 9, wherein the motor torque is shaped by a filter that smooths changes in a motor torque signal to improve driveability.

11. The vehicle of claim 8 wherein the predetermined time period is a delay time required to increase engine torque output from a current torque level to the maximum torque output.

12. The vehicle of claim 8 wherein the torque boost request further includes a battery charge power request that is summed with the torque boost request to generate an engine torque command that is between an engine torque minimum value and an engine torque maximum value.

13. The vehicle of claim 8 wherein the increase in motor torque is between a battery discharge maximum limit and a battery charge minimum limit.

14. The vehicle of claim 13 wherein the battery discharge maximum limit and the battery charge minimum limit are calibrated to include a system power loss value.

15. A vehicle comprising:
a controller program to, in response to a torque demand greater than an engine torque capability,
increase an electric-motor torque for a first period of time to satisfy the torque demand, wherein a maximum torque output of the engine and a first substantially constant value of the electric-motor torque are obtained and then maintained during the first period of time, and
reduce the electric-motor torque during a second period of time, after the first period of time, to preserve battery charge such that a combined engine and electric-motor torque is less than the torque demand, wherein the engine maintains the maximum torque output value and the motor maintains a second substantially constant torque value during the second period of time.

16. The vehicle of claim 15, wherein the first period of time corresponds to a period of time that includes a torque increase delay response of the engine.

17. The vehicle of claim 15, wherein the first period of time corresponds to a period of time that includes a torque increase delay response of the engine followed by a duration in which the torque demand is greater than a maximum torque output of the engine.

18. The vehicle of claim 17, wherein the electric-motor charges a battery once a torque demand drops below the maximum torque output of the engine.

* * * * *